United States Patent [19]

Watanabe et al.

[11] Patent Number: 4,912,834
[45] Date of Patent: Apr. 3, 1990

[54] METHOD OF ADJUSTING THERMAL BALANCE OF ROTOR

[75] Inventors: Takashi Watanabe; Ryoichi Shiobara; Masayuki Furuyama, all of Hitachi; Masao Ohi, Mito, all of Japan

[73] Assignee: Hitachi, Ltd., Tokyo, Japan

[21] Appl. No.: 238,197

[22] Filed: Aug. 30, 1988

[30] Foreign Application Priority Data

Sep. 4, 1987 [JP] Japan ................................ 62-220169

[51] Int. Cl.⁴ .......................................... H02K 15/02
[52] U.S. Cl. ........................................ 29/598; 73/66; 74/573 F
[58] Field of Search ............... 73/66, 459, 460; 310/52, 55, 61, 214; 74/573 F; 29/598

[56] References Cited
U.S. PATENT DOCUMENTS

| 3,622,820 | 11/1971 | Tjernstrum | 29/598 |
| 4,311,931 | 1/1982 | Fujioka et al. | 310/61 |
| 4,319,149 | 3/1982 | Eckels | 310/52 |
| 4,363,982 | 12/1982 | Kaminski | 310/61 |
| 4,370,800 | 2/1983 | Kuzmin et al. | 310/61 |

Primary Examiner—Hezron E. Williams
Assistant Examiner—Robert P. Bell
Attorney, Agent, or Firm—Antonelli, Terry & Wands

[57] ABSTRACT

A method of adjusting a thermal balance of a rotor. When obtaining a difference in shaft-vibration component of the rotor between an actual load condition and a no load condition, on the basis of detection results at a simulated load, a difference in shaft-vibration component of the rotating rotor between a no-load condition and a condition in which the rotor is heated from the outside and a difference in shaft-vibration component of the rotating rotor between a no-load condition and a condition in which the rotor is heated from the inside are detected at the simulated load. The detected differences in shaft-vibration component are converted respectively to differences in shaft-vibration component under a temperature condition at the actual load. Both the converted differences in shaft-vibration component are added to each other in a vector manner to obtain a difference in rotor shaft-vibration component at the actual load. Coolant flow rate at each section within the rotor is adjusted to eliminate the difference in rotor shaft-vibration component, thereby adjusting the thermal balance of the rotor.

5 Claims, 4 Drawing Sheets

METHOD OF ADJUSTING THERMAL BALANCE OF ROTOR

BACKGROUND OF THE INVENTION

The present invention relates to a method of adjusting a thermal balance of rotor for a rotary electric machine and, more particularly, to a rotor thermal-balance adjusting method in which the rotor is provided with a coolant passageway. Coolant such as, for example, hydrogen is passes through the coolant passageway to cool the rotor.

In general, balance adjustment is applied to a rotary element to reduce shaft-vibration as much as possible. One method of balance adjustment of the rotary element uses a balance weight which is adjusted in magnitude and position to adjust the balance of the rotary element. This adjusting method is relatively simple, and can balance the rotary element with a high degree of accuracy.

In the case of a rotor for a rotary electric machine, however, the rotor itself is charged with heat so deflections of the rotor shaft due to the heat occur, as well as local shaft-deformation due to non-uniformity in heat radiation from the rotor surface. That is, shaft-deformation due to a thermal imbalance, resulting in shaft-vibration. It is impossible for mere mechanical or formal balancing to reduce the shaft-vibration.

It is extremely difficult to eliminate the thermal imbalance. Research has been conducted to avoid the thermal imbalance, and various thermal-balance adjusting methods have been proposed. However, a satisfactory method has not yet been proposed.

Of the conventional methods, a relatively excellent thermal-balance adjusting method is known from, for example, Japanese Patent Publication No. 58-40899. In the method proposed in the Japanese patent, a cooling-medium flow passageway within the rotor is regulated to eliminate the thermal imbalance. It is possible for this method to effect a superior thermal balance, if it is clear which main component is to be corrected. It is a problem, however, that the superiority depends on how the component to be corrected should be accurately detected or calculated.

It will suffice for a general rotary electric machine to have the rotor driven both under no load condition and under an actual load condition. A shaft-vibration component of the thermal imbalance is detected, and a corresponding correction is made to the shaft-vibration component of the thermal imbalance. Accordingly, it is possible for the general rotary electric machine to effect the thermal balance without any difficult. It is usual for a rotary electric machine which is large in capacity, however, to have, in spite of the balance adjustment being sufficiently been carried out, thermal imbalance which is not sufficiently eliminated. The reason for this is that, since the balance adjustment is carried out within a factory under a stimulated load, and since some of the rotary electric machines employ, as cooling medium, special gas such as, for example, hydrogen gas, the cooling condition due to the coolant at adjustment of the thermal balance differs from that at practical running. That is, even in the rotary electric machine of the kind referred to above which employs the hydrogen gas as the coolant, the hydrogen gas may not be used for balance adjustment because of explosive danger. It is usual for such a rotary electric machine to carry out the balance adjustment using, in general, cooling air as the coolant. For this reason, even if the rotor itself is the same temperature as the actual load condition, flow rate of the coolant at each section and cooling performance at the balance adjustment differ from those during actual running because hydrogen gas and air perform differently as the coolant. Accordingly, even if the thermal balance is excellent at the balance adjustment within the factory, the thermal balance is not necessarily excellent under the practical-use load condition.

SUMMARY OF THE INVENTION

It is therefore an object of the invention to provide a method of adjusting a thermal balance of the rotor of the kind referred to above, which can effect excellent thermal balance even if the practical-use condition is different from the condition at the balance adjustment within the factory.

According to the instant invention, a difference in a shaft-vibration component of the rotor between an actual load condition and a no-load condition is obtained through the following steps. In a first step, the rotor is rotated at a predetermined speed, and then is heated by the air surrounding the rotor. A difference in shaft-vibration component between the condition before heating and the condition after heating is detected. In a second step, under a condition not influenced by the first step, the rotor-coil is energized and heated up. A difference in shaft-vibration component between the condition before energizing and the condition after energizing is detected. In a third step, the difference in shaft-vibration component detected in the first step and the difference in shaft-vibration component detected in the second step are converted into respective differences according to the temperature condition in the actual load. In a forth step, these converted differences in shaft-vibration component are further converted into respective vector-quantities and those vector-quantities are added to each other, so that the difference in shaft-vibration component of the rotor between the actual load condition and the no-load condition is obtained.

In the method described above, because the respective imbalances occur linearly with respect to the temperature rise, the respective differences in shaft-vibration components are determined in their respective imbalance directions, and are determined in their respective quantities by conversion due to the temperature. Accordingly, the direction and quantity of the difference in shaft-vibration component which occurs at the actual load can correctly be known under simulated conditions, making it possible to effect an excellent thermal balance even in the rotary electric machine of the kind referred to above.

DETAILED DESCRIPTION

Figure 1:
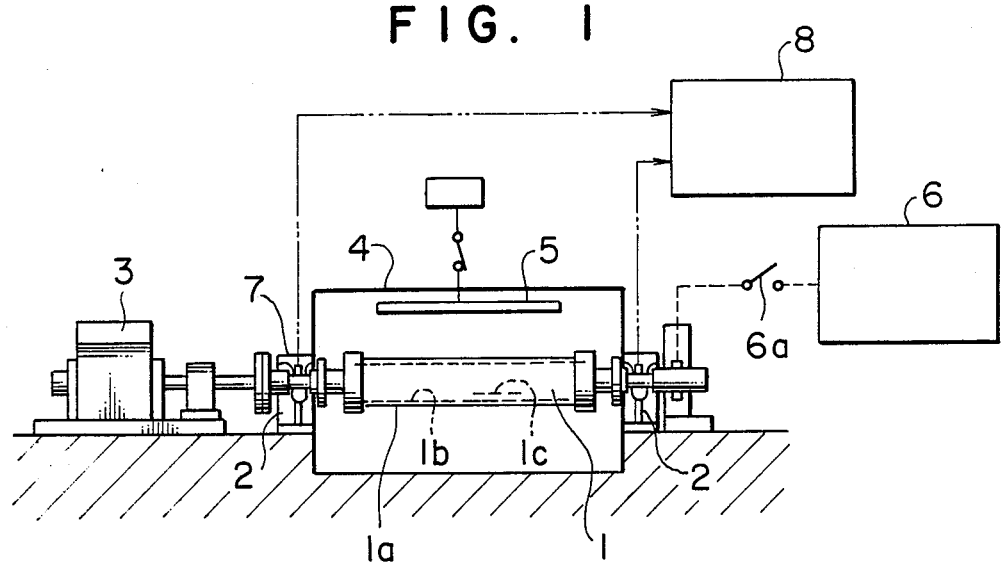
FIGS. 1 and 2 are diagrammatic views respectively showing balance adjusting states for explanation of a thermal-balance adjusting method according to the invention.
Figure 2:
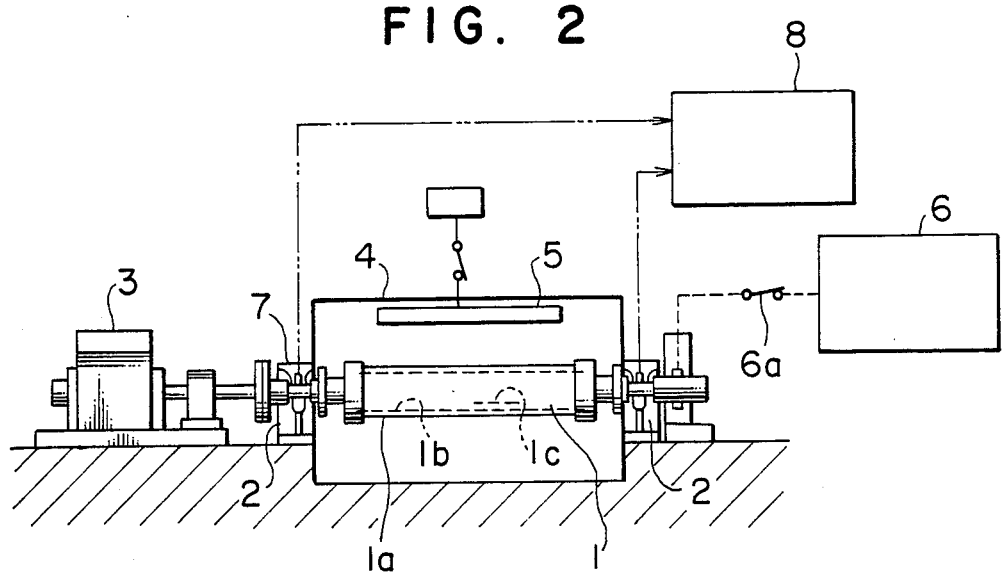

The invention will be described below in detail with reference to an embodiment illustrated in the drawings. FIGS. 1 and 2 show, in due order, a thermal-balance adjusting method according to the embodiment.

Figure 3:
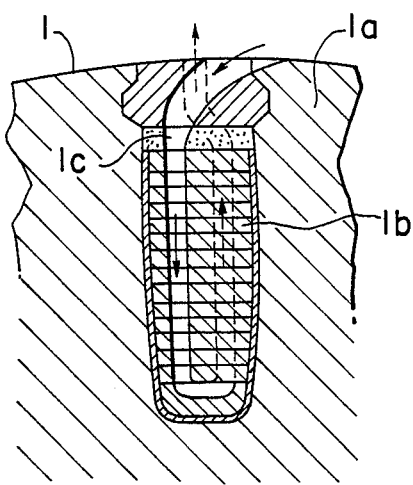
FIG. 3 is a cross-sectional view of a principal portion of a rotor body section.

Various component parts and devices will first be described prior to explanation of the adjusting method. In the figures, the reference numeral 1 denotes a rotor to be adjusted in thermal balance. The rotor 1 comprises a rotor body section 1a, and a rotor coil 1b which is wound about and accommodated in the rotor body section 1a. The rotor 1 is provided therein, for example, with a flow passageway 1c for coolant for cooling the rotor body section 1a and the rotor coil 1b, as shown in FIG. 3. The flow passageway 1c is so formed as to be capable of adjusting the flow rate of the coolant to a certain degree.

The rotor 1 is rotatably supported by a pair of bearings 2, and is adapted to be rotated at a predetermined rotational speed by an electric drive motor 3 when the rotor 1 is adjusted in balance. Moreover, the body section 1a of the rotor 1 is covered by a cover member 4 such that the rotor 1 rotates within the cover member 4. Arranged in an internal space within the cover member 4 is a heating device 5 for heating controllably the rotor 1 from the outer peripheral surface of the rotor 1. The heating device 5 can be replaced with a cooling device if the rotor surface is excessively raised in temperature due to friction against air. On the other hand, a device for heating the rotor 1 from the inside is designated by the reference numeral 6. That is, the heating device 6 is an electric power source device which energizes the rotor coil 1b, and heat generated by the copper loss of the coil 1b heats the rotor 1 from the inside. The electric power source device 6 is capable of adjusting electric current passed through the rotor coil 1b. The reference numeral 6a denotes a switch for the electric power source device 6.

Designated by the reference numeral 7 at the bearing 2 is a shaft-vibration sensor, and the reference numeral 8 denotes a shaft-vibration measuring device.

Figure 4:
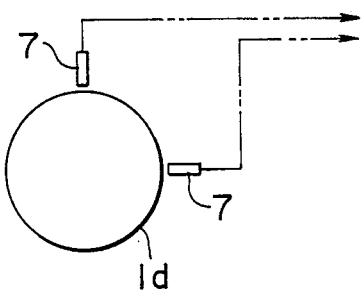
FIG. 4 is a diagrammatic view showing the arrangement of shaft-vibration detecting sensors.

The method of adjusting the thermal balance of the rotor will next be described successively. First, as shown in FIG. 1, the rotor 1 is rotated at the predetermines speed in such a state that the internal heating device 6 is rendered inoperative (the switch 6a OFF) and the external heating device 5 heats the rotor 1. A difference in shaft-vibration of the rotor 1 at this time is detected by the shaft-vibration measuring device 8 through the shaft-vibration sensor 7. In this case, a plurality of shaft-vibration sensors 7 are arranged in circumferentially spaced relation to each other as shown in FIG. 4, to detect the magnitude of the shaft-vibration and the direction thereof, that is, a shaft-vibration component.

Figure 5:
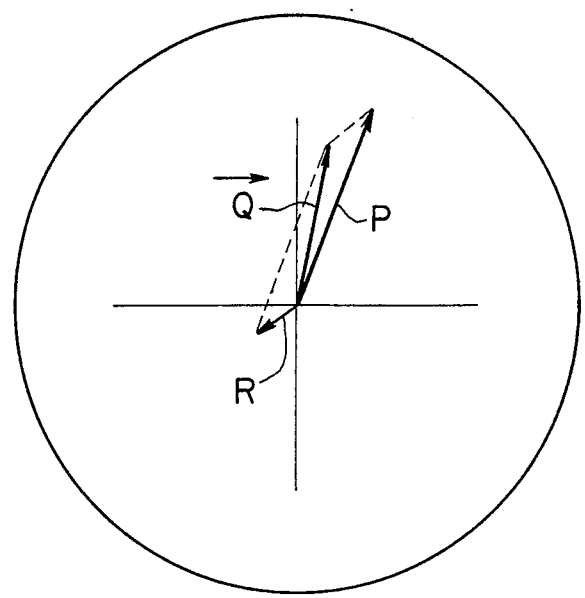
FIGS. 5 and 6 are circle diagrams showing differences in shaft-vibration component.

When the difference in shaft-vibration component detected at this time is indicated in a circle diagram, there is obtained a difference in shaft-vibration component P shown in FIG. 5.

Detection shown in FIG. 2 will next be carried out. Specifically, the internal heating device 6 heats the rotor 1, that is, the switch 6a is closed, and a predetermined electric current is supplied to the rotor coil 1b from the electric power source device 6 so that the rotor 1 is heated from the inside. In addition, the rotor 1 is rotated and heated also by the external heating device 5. A difference in shaft-vibration components is detected at this time.

When the difference in shaft-vibration components detected at this time is indicated in a circle diagram, there is obtained a difference in shaft-vibration component Q shown in FIG. 5.

The difference in shaft-vibration component Q is a difference in shaft-vibration component of the rotor heated from the inside and the outside. From this difference in shaft-vibration component Q and the aforementioned difference in shaft-vibration component P, there is obtained a difference in shaft-vibration component R shown in FIG. 5, that is, a difference in shaft-vibration component of the rotor heated only from the inside.

Of course, in this case if the rotor is heated only from the inside and a difference in shaft-vibration component under the condition is detected, it is possible to know the component R. In practice, however, because surface air friction due to rotation of the rotor causes the rotor surface to be heated, the above-mentioned process is executed. It is needless to say that if an especial cooling device is previously arranged to prevent the rotor surface from being heated, the difference in shaft-vibration component R of the rotor heated only from the inside can easily be obtained.

The thus detected respective differences in shaft-vibration components are represented by the following equations. In the equations, a difference in shaft-vibration component per one degree of a temperature rise of the rotor is $\vec{A}$, and a difference in shaft-vibration component per one degree of a temperature rise of the coil is $\vec{B}$:

$$\vec{A} = \frac{1}{T_{a1} - T_{a0}} \times \vec{P}$$

$$\vec{B} = \frac{1}{T_{b3} - T_{b0}} \times \vec{R}$$

where $T_{a1}$: rotor shaft temperature after heating;
$T_{a0}$: rotor shaft temperature before heating;
$T_{b3}$: rotor coil temperature heating;
$T_{b0}$: rotor coil temperature before heating;
$\vec{P}$: difference in shaft-vibration component at external heating; and
$\vec{R}$: difference in shaft-vibration component at internal heating.

Figure 6:
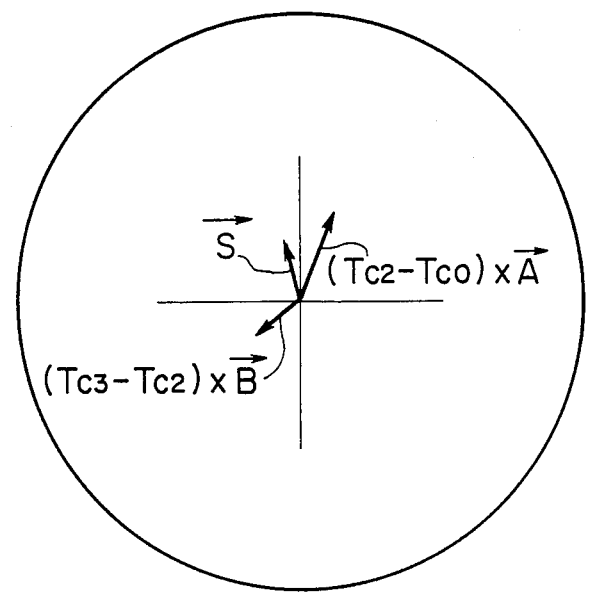

On the basis of the above results, a vibration difference vector $\vec{S}$ at the actual load is indicated as shown in FIG. 6, because the vibration difference vector $\vec{S}$ is the temperature-converted vector sum of the differences in shaft-vibration component $\vec{A}$ and $\vec{B}$. If the vibration difference vector $\vec{S}$ is expressed by an equation, the equation is represented as follows:

$$\vec{S} = (T_{c2} - T_{c0}) \times \vec{A} + (T_{c3} - T_{c0}) \times \vec{B}$$

where $T_{c2}$: rotor shaft temperature after heating;
$T_{c0}$: rotor and shaft temperature before heating; and
$T_{c3}$: rotor coil temperature after heating.

The difference in shaft-vibration component $\vec{S}$ is a thermal imbalance component at the actual load. In practical use, the coolant flow passageway within the rotor is adjusted to give a component reverse to this difference in shaft-vibration component $\vec{S}$. For instance, as disclosed also in Japanese Patent Publication No. 58-40899, wedges are moved axially to adjust the coolant flow rate entering the flow passageway, thereby adjusting the thermal imbalance occurring within the rotor of a generator.

Figure 7:
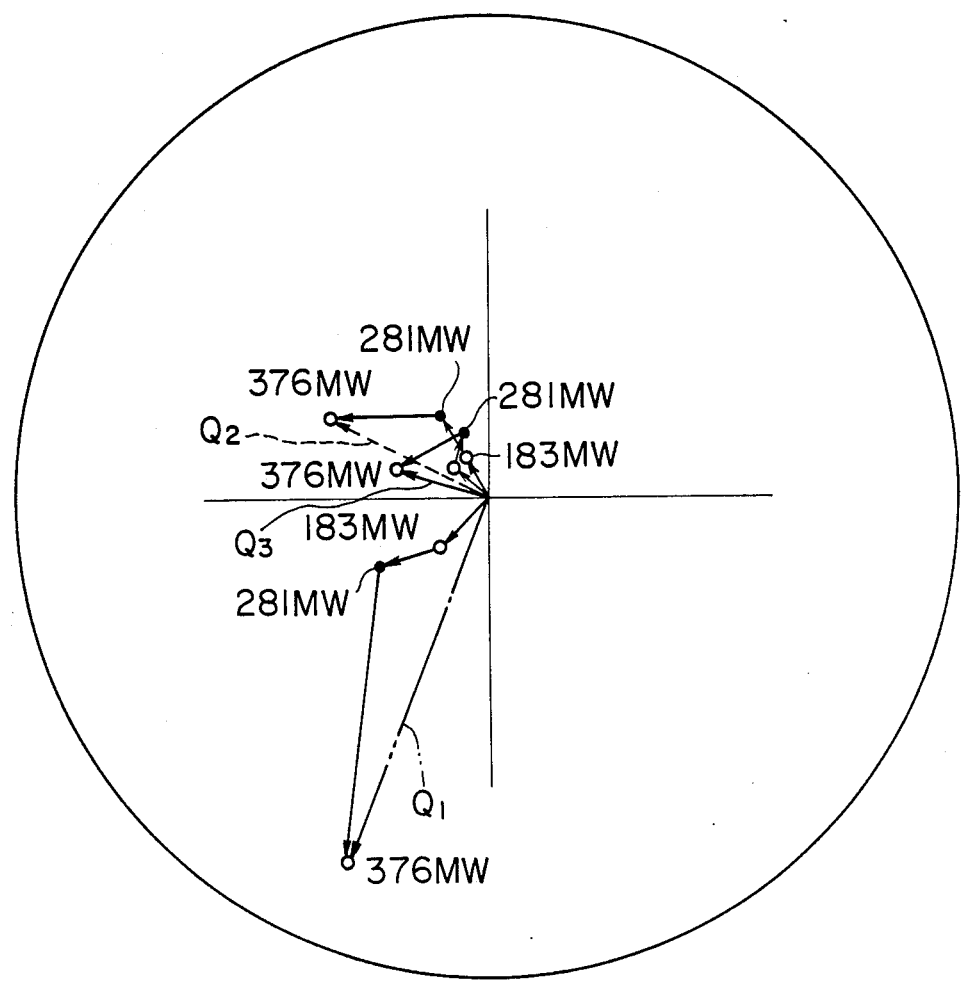
FIG. 7 is a circle diagram representing the relationship between an electric output and the difference in shaft-vibration.

The rotor due to the conventional balance adjusting method and the rotor due to the balance adjusting method according to the invention will next be compared in effect with each other, on the basis of the actually measured data shown in FIG. 7.

FIG. 7 shows the relation between the difference in shaft-vibration and the output at a predetermined rotational speed. The rotor offered to the experiment is generally called large capacity in which the output is 376 MW and the rotational speed is 3600 r.p.m.

A straight line $Q_1$ indicated by the two-dot chain line in FIG. 7 represents the difference in shaft-vibration component of the rotor not adjusted in thermal balance, whereas a straight line $Q_2$ represents the difference in shaft-vibration component of the rotor adjusted in thermal balance according to the convention method. It will be seen from FIG. 7 that the difference in shaft-vibration is considerably reduced by the conventional method. A straight line $Q_3$, which indicates a further reduction in difference in shaft-vibration component than the straight line $Q_2$, represents the difference in shaft-vibration component of the rotor adjusted in thermal balance according to the present invention. Comparison between these straight lines $Q_2$ and $Q_3$ clearly shows that the difference in shaft-vibration component in the method of the present invention is an approximate half of the difference in the conventional method. Thus, it will be appreciated how the method according to the invention is excellent.

As described above, in the present invention, when obtaining an estimated difference in shaft-vibration component of the rotor at an actual load by using a simulated load, at least two independent shaft-vibration components at the simulated load, that is, a difference in shaft-vibration component detected while the rotor is heated from the circumference and a difference in shaft-vibration component detected while the rotor coil is energized to heat the rotor from the inside are detected separately from each other; these differences in shaft-vibration component are thermally converted respectively to differences in shaft-vibration components under a temperature condition at the actual load; and both the differences in shaft-vibration component are added to each other in a vector manner to obtain a difference in shaft-vibration component of the rotor at the actual load. Accordingly, even if the circumferential conditions at the adjustment of thermal balance under the simulated load differ from those at the actual load, and even in case where the simulated load largely differs from the actual load, compensation of the rotor according to the external temperature and compensation of the rotor according to heating of the rotor coil are carried out by the temperature conversion varying linearly, making it possible to effect an excellent thermal balance.

What is claimed is:

1. A method of adjusting a thermal balance of a rotor provided therein with a heat generating section and a coolant passageway for cooling the heat generating section, said method comprising the steps of:
   detecting a difference in shaft-vibration component of the rotor rotating at a predetermined speed between a no-load condition of the rotor and a condition in which the rotor is heated only from the outside of the rotor and, detecting a difference in shaft-vibration component of the rotor rotating at a predetermined speed between a no-load condition of the rotor and a condition in which the rotor is heated only from the inside of the rotor;
   converting the detected differences in shaft-vibration component respectively to differences in shaft-vibration component under a temperature at an actual load condition in accordance with a difference in temperature between the no-load condition and the actual load condition;
   adding the converted differences in shaft-vibration component to each other in a vector manner to obtain a difference in shat-vibration component at the actual load condition; and
   adjusting a flow rate of the coolant within said rotor in response to the vector-added difference in shaft-vibration component so that the vector-added difference in shaft-vibration component is reduced toward zero.

2. A method of adjusting a thermal balance of a rotor in which a rotor coil is wound within and accommodated in a rotor body section, and said rotor has a coolant flow passageway within said rotor body section, said method comprising the steps of:
   detecting a difference in shaft-vibration component of the rotor rotating at a predetermined speed between a no-load condition of the rotor and a condition in which the rotor is heated from the outside of the rotor and, detecting a difference in shaft-vibration component of the rotor rotating at a predetermined speed between a no-load condition of the rotor and a condition in which the rotor coil is energized and heated;
   converting the detected differences in shaft-vibration component respectively to differences in shaft-vibration component under a temperature at an actual load condition in accordance with a difference in temperature between the no-load condition and the actual load condition;
   adding the converted differences in shaft-vibration component to each other in a vector manner to obtain a difference in shaft-vibration component at the temperature at the actual load condition; and
   adjusting a flow rate of the coolant within said rotor in response to the vector-added difference in shaft-vibration component so that the vector-added difference in shaft-vibration component is reduced toward zero.

3. A method of adjusting a thermal balance of a rotor in which a rotor coil is wound about and accommodated in a rotor body section, and said rotor has a coolant flow passageway within said rotor body section, said method comprising the steps of:
   detecting a difference in shaft-vibration component of the rotor rotating at a predetermined speed between a no-load condition of the rotor and a condition in which the rotor is heated from the outside of the rotor at a predetermined temperature and, detecting a difference in shaft-vibration component of the rotor rotating at a predetermined speed between a no-load condition of the rotor and a condition in which the rotor is heated from the inside of the rotor at a predetermined temperature;
   converting the detected differences in shaft-vibration component respectively to differences in shaft-vibration component at a temperature at an actual load condition in accordance with a difference in temperature between the no-load condition and the actual load condition;

adding both the converted differences in shaft-vibration component to reach other in a vector manner to obtain a difference in shaft-vibration component at the actual load condition; and adjusting a flow rate of the coolant at each section within said rotor in response to the obtained difference in shaft-vibration component, thereby adjusting the balance of the rotor.

4. A method of adjusting a thermal balance of a rotor within an air atmosphere, said rotor comprising a rotor shaft having a body section, a coil wound about said body section, and a coolant flow passageway within said body section, the coolant being caused to pass through said coolant flow passageway for cooling said coil, said rotor being, in practice, rotated within a cooling hydrogen gas atmosphere; said method comprising the steps of:

detecting a difference in shaft-vibration component of the rotor rotating in the air atmosphere between a no-load condition of the rotor and a condition in which the rotor is heated from the outside of the rotor and, detecting a difference in shaft-vibration component of the rotor rotating in the air atmosphere between a no-load condition of the rotor and a condition in which the rotor coil is energized and heated by copper loss heat;

converting the detected differences in shaft-vibration component respectively to differences in shaft-vibration component under a temperature at an actual load condition in accordance with a difference in temperature between the no-load condition and the actual load condition;

adding both the converted differences in shaft-vibration component to each other in a vector manner to obtain a difference in shaft-vibration component at the actual load condition; and adjusting a cooling degree of each section within said rotor on the basis of the thus obtained difference in shaft-vibration component, thereby adjusting the thermal balance of said rotor.

5. A method of adjusting a thermal balance of a rotor in which a rotor coil is wound about and accommodated in a rotor body section, and said rotor has a coolant flow passageway within said rotor body section, said method comprising the steps of:

detecting a difference in shaft-vibration component of the rotor between a no-load condition and a condition in which the rotor is heated from the outside of the rotor and, detecting a difference in shaft-vibration component of the rotor between a no-load condition and a condition in which the rotor is heated from the outside and the inside of the rotor;

on the basis of both the differences in shaft-vibration component, obtaining a difference in shaft-vibration component which occurs when said rotor is heated from the inside;

converting the thus obtained difference in shaft-vibration component and said difference in shaft-vibration component of said rotor heated from the outside, respectively, to differences in shaft-vibration component at a temperature at an actual load condition in accordance with a difference in temperature between the no-load condition and the actual load condition;

adding both the converted differences in shaft-vibration component to each other in a vector manner to obtain a difference in shaft-vibration component at the actual load condition; and regulating a flow rate of the coolant at each section within said rotor in response to the thus obtained difference in shaft-vibration component.

* * * * *